US008472159B2

(12) United States Patent
Thompson

(10) Patent No.: US 8,472,159 B2
(45) Date of Patent: Jun. 25, 2013

(54) METHOD TO CHARGE TONER FOR ELECTROPHOTOGRAPHY USING CARBON NANOTUBES OR OTHER NANOSTRUCTURES

(75) Inventor: Michael Donald Thompson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 300 days.

(21) Appl. No.: 12/202,787

(22) Filed: Sep. 2, 2008

(65) Prior Publication Data

US 2010/0053840 A1 Mar. 4, 2010

(51) Int. Cl.

| | |
|---|---|
| ***G03G 15/02*** | (2006.01) |
| ***H05H 3/00*** | (2006.01) |
| *H01T 23/00* | (2006.01) |
| *H01G 7/02* | (2006.01) |
| *H05F 3/00* | (2006.01) |

(52) U.S. Cl.
USPC ............................ 361/225; 361/230; 361/233

(58) Field of Classification Search
USPC ......................................... 361/225, 230, 233
See application file for complete search history.

(56) References Cited

U.S. PATENT DOCUMENTS

| | | | | |
|---|---|---|---|---|
| 5,893,015 | A | 4/1999 | Mojarradi et al. | |
| 6,999,699 | B2 * | 2/2006 | Nagatomo et al. | 399/175 |
| 7,149,460 | B2 * | 12/2006 | Hays | 399/252 |
| 7,228,091 | B2 * | 6/2007 | Hays et al. | 399/168 |
| 7,397,032 | B2 * | 7/2008 | Zona et al. | 250/326 |
| 7,466,942 | B2 * | 12/2008 | Zona et al. | 399/168 |
| 2002/0037182 | A1 | 3/2002 | Miyaguchi et al. | |
| 2006/0210316 | A1 | 9/2006 | Hays | |
| 2007/0235647 | A1 * | 10/2007 | Zona et al. | 250/326 |
| 2009/0224679 | A1 * | 9/2009 | Pan et al. | 315/162 |

OTHER PUBLICATIONS

European Patent Office, European Search Report, European Application No. 09167683.3, Dec. 7, 2009, 3 Pages.

* cited by examiner

*Primary Examiner* — Jared Fureman
*Assistant Examiner* — Lucy Thomas
(74) *Attorney, Agent, or Firm* — MH2 Technology Law Group LLP

(57) ABSTRACT

In accordance with the invention, there are systems and methods to impart an electrostatic charge to particles. An exemplary method can include providing a plurality of particles to be charged and providing a plurality of nanostructures disposed over a first electrode array, the first electrode array including a plurality of electrodes spaced apart. The method can also include providing a multi-phase voltage source operatively coupled to the first electrode array and applying a multi-phase voltage to the first electrode array to create a traveling electric field between each electrode of the first electrode array, thereby causing electron emission from the plurality of nanostructures and forming a plurality of charged particles. The method can further include transporting each of the plurality of charged particles using the traveling electric field onto a surface.

14 Claims, 3 Drawing Sheets

METHOD TO CHARGE TONER FOR ELECTROPHOTOGRAPHY USING CARBON NANOTUBES OR OTHER NANOSTRUCTURES

FIELD OF THE INVENTION

The present invention relates to image forming apparatus and more particularly to systems and methods of charging particles.

BACKGROUND OF THE INVENTION

Conventional xerographic powder marking depends on charged toner particles to develop a latent xerographic image. However, this toner charge must be regulated and kept within specified ranges for the printing system to work properly. Control of toner charge has thus been the subject of much research. There are many methods of charging toner particles, for example, in two component development systems the toner particle is charged by contact with a carrier surface, wherein the chemistry of the carrier surface is optimized such that charge transfers from the carrier surface to the toner particle. Control of the charge is accomplished by additives and controlling the concentration of toner to carrier which requires a precise sensor. However, when the toner or carrier surface ages or the water content in the air changes, new charge relationships leading to complex materials designs and control algorithms are needed to stabilize the developed image.

Accordingly, there is a need for a new method to charge a toner.

SUMMARY OF THE INVENTION

In accordance with various embodiments, there is a method to impart an electrostatic charge to particles. The method can include providing a plurality of particles to be charged and providing a plurality of nanostructures disposed over a first electrode array, the first electrode array including a plurality of electrodes spaced apart. The method can also include providing a multi-phase voltage source operatively coupled to the first electrode array and applying a multi-phase voltage to the first electrode array to create a traveling electric field between each electrode of the first electrode array, thereby causing electron emission from the plurality of nanostructures and forming a plurality of charged particles. The method can further include transporting each of the plurality of charged particles using the traveling electric field onto a surface.

According to various embodiments, there is another method to impart an electrostatic charge to particles. The method can include providing a plurality of particles to be charged and providing a plurality of nanostructures disposed over a first electrode, the first electrodes disposed in close proximity to a rotating surface. The method can further include applying an electric field between the first electrode and the rotating surface, thereby causing electron emission from the plurality of nanostructures and forming a plurality of charged particles.

According to yet another embodiment, there is a system to impart an electrostatic charge to particles. The system can include a plurality of nanostructures disposed over a first electrode array, wherein the first electrode array includes a plurality of electrodes spaced apart and a power source operatively coupled to the first electrode array to supply a multi-phase voltage to the first electrode array to create a traveling electric field between each electrode of the first electrode array, wherein the traveling electric field causes electron emission from the plurality of nanostructures and form a plurality of charged particles. The system can also include a surface in close proximity to the plurality of nanostructures, wherein the plurality of charged particles are transported onto the surface using the traveling electric field.

According to another embodiment, there is a system to impart an electrostatic charge to particles including a plurality of particles to be charged. The system can also include a plurality of nanostructures disposed over a first electrode, the first electrode disposed in close proximity to a rotating surface and a power source to supply a voltage to create an electric field between the first electrode and the rotating surface, wherein the electric field causes an electron emission from the plurality of nanostructures and form a plurality of charged particles.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
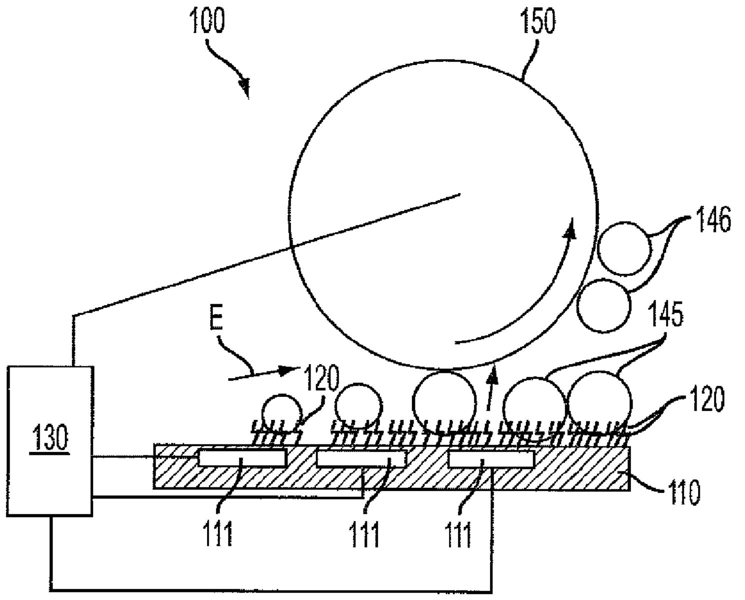
FIG. 1 illustrates an exemplary system to impart an electrostatic charge to particles, according to various embodiments of the present teachings.

FIG. 1 illustrates an exemplary system 100 to impart an electrostatic charge to a particle 145. The system 100 can include a plurality of nanostructures 120 disposed over a first electrode array 111, wherein the first electrode array 111 can include a plurality of electrodes spaced apart, as shown in FIG. 1. In various embodiments, the plurality of nanostructures 120 can be disposed over a first substrate 110, the first substrate 110 including the first electrode array 111. In some embodiments, the first electrode array 111 can be deposited over an electrically insulating substrate 110 and coated over with a protective and charge dissipative coating (not shown) to get rid of the static charge build up. Exemplary materials for the substrate 110 can include, but are not limited to, polyimide, polyester, polystyrene, or any good electrical insulator. Exemplary material for the first electrode array 111 can include, copper, gold, or any good electrical conductor. Exemplary nanostructures 120 can include, but are not limited to single walled carbon nanotubes (SWNT), double walled carbon nanotubes (DWNT), and combinations thereof. In some embodiments, nanostructures 120 can be formed of one or more elements from Groups IV, V, VI, VII VIII, IB, IIB, IVA and VA. The nanostructures 120 can be fabricated by any suitable method, including, but not limited to, vacuum metallization and vacuum deposition. In various embodiments, the nanostructures 120 can have a diameter from about 10 nm to about 450 nm and length from about 1 μm to about 200 μm.

The system 100 can also include a power source 130 operatively coupled to the first electrode array 111 to supply a multi-phase voltage to the first electrode array 111 to create a traveling electric field between each electrode of the first electrode array 111, wherein the traveling electric field can cause an electron emission from the plurality of nanostructures 120 and form a plurality of charged particles 146. In various embodiments, an amount of electrostatic charge of each of the plurality of charged particles 146 can be controlled by the magnitude and frequency of the traveling electric field. The system 100 can also include a surface 150 in close proximity to the plurality of nanostructures 120, wherein the plurality of charged particles 146 can be transported onto the surface 150 using the traveling electric field. In various embodiments, the surface 150 can include at least one of a donor roll, a belt, a receptor, and a semi-conductive substrate. In certain embodiments, the surface 150 can include a rotating substrate. In some embodiments, the power source 130 can be operatively coupled to the first electrode array 111 and the surface 150.

Figure 2:
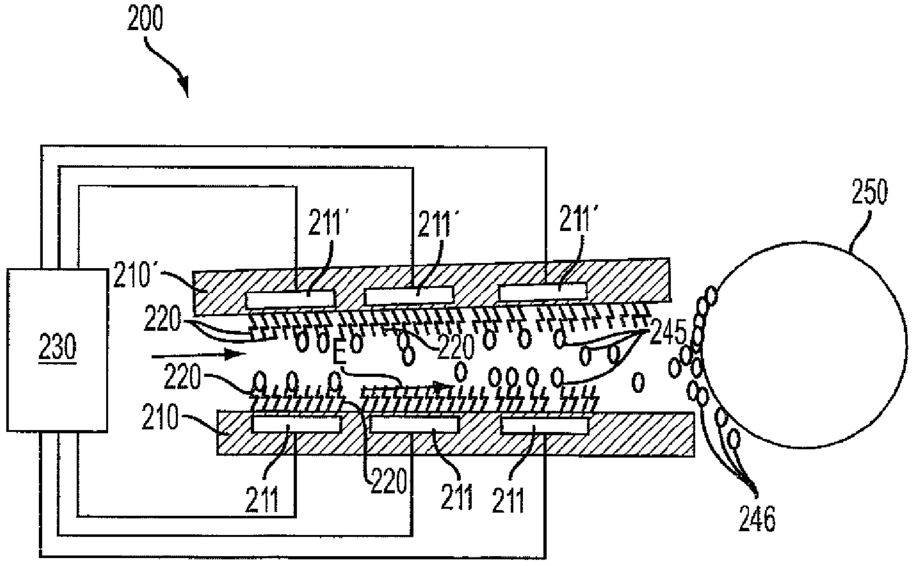
FIG. 2 illustrates another exemplary system to impart an electrostatic charge to particles, according to various embodiments of the present teachings.

FIG. 2 shows another exemplary system 200 to impart an electrostatic charge to particles 245. The system 200 can include a first plurality of nanostructures 220 disposed over a first electrode array 211, the first electrode array 211 including a plurality of electrodes spaced apart and a second plurality of nanostructures 220' disposed over a second electrode array 211', the second electrode array 211' including a plurality of electrodes spaced apart, wherein the second electrode array 211' can be disposed substantially parallel to and opposite to the first electrode array 211. In certain embodiments, the first plurality of nanostructures 220 can be disposed over a first substrate 210, the first substrate 210 including the first electrode array 211 and the second plurality of nanostructures 220' can be disposed over a second substrate 210', the second substrate 210' including the second electrode array 211'. In some embodiments, the first electrode array 211 can be deposited over an electrically insulating substrate 210 and coated over with a protective and charge dissipative coating. In other embodiments, the second electrode array 211' can be deposited over an electrically insulating substrate 210' and coated over with a protective and charge dissipative coating. The system 200 can also include a power source 230 operatively coupled to the first electrode array 211 and the second electrode array 211' to apply multi-phase voltages to the first electrode array 211 and the second electrode array 211' to create a traveling electric field between each electrode of the first and the second electrode array 211, 211'. The system 200 can also include a surface 250 in close proximity to the plurality of nanostructures 220, 220' wherein the plurality of charged particles 246 can be transported onto the surface 250 using the traveling electric field.

In some embodiments, the substrate 110, 210, 210' can be a flexible circuit board including about 20 μm to about 150 μm thick polyimide film having metal electrodes such as, copper. In various embodiments, each of the plurality of electrodes of the first electrode array 111, 211 and the second electrode array 211' can have a width from about 10 μm to about 100 μm and a thickness from about 4 μm to about 10 μm. In certain embodiments, the first and the second electrode array 111, 211, 211' can have a spacing between each of the plurality of electrodes equal to the width of each of the plurality of electrodes.

According to various embodiments, there is a method to impart an electrostatic charge to particles 145, 245. The method can include providing a plurality of particles 145, 245 to be charged, providing a plurality of nanostructures 120, 220 disposed over a first electrode array 111, 211, the first electrode array 111, 211 including a plurality of electrodes spaced apart, and providing a multi-phase voltage source 130, 230 operatively coupled to the first electrode array 211. In some embodiments, the step of providing a multi-phase voltage source 130, 230 can include providing a multi-phase voltage source 130 operatively coupled to the first electrode array 111 and the surface 150 as shown in FIG. 1. In other embodiments, the step of providing a plurality of nanostructures 120, 220 disposed over a first electrode array 111, 211 can include providing a plurality of nanostructures 120, 220 disposed over the substrate 110, 210 including the first electrode array 111, 211. The method can also include applying a multi-phase voltage to the first electrode array 111, 211 to create a traveling electric field between each electrode of the first electrode array 111, 211, thereby causing an electron emission from the plurality of nanostructures 120, 220 and forming a plurality of charged particles 146, 246 and transporting each of the plurality of charged particles 146, 246 using the traveling electric field onto a surface 150, 250. In various embodiments, the method can further include using the frequency and magnitude of the traveling electric field to control an amount of electrostatic charge of each of the plurality of charged particles 146, 246.

In certain embodiments, the method can further include providing a second plurality of nanostructures 220' disposed over a second electrode array 211', the second electrode array 211' including a plurality of electrodes spaced apart, wherein the second electrode array 211' can be disposed substantially parallel to and opposite to the first electrode array 211, as shown in FIG. 2. In some embodiments, the step of applying a multi-phase voltage to the first electrode array 211 to create a traveling electric field between each electrode of the first electrode array 211 can include applying multi-phase voltages to the first and the second electrode array 211, 211' to create traveling electric fields between each electrode of the first and the second electrode array. While not intending to be bound by any specific theory, it is believed that the electric field in the traveling electric field drops off as one move off the substrate 210 in a direction perpendicular to the active region. Hence, particle charging can occur in the regions where the fields are strongest and the transport field (traveling electric field) is also strongest here tending to move the charged particles along the substrate 210. The placement of the parallel traveling electric field grid allows particles 145, 245 which drift out of the transport fields of the first or the second electrode array 111, 211, 211' to be captured by the other. In various embodiments, the traveling electric field can be at least one of a square-wave alternating electric field, a sinusoidal alternating electric field, and sum of sinusoidal electric fields, wherein the sum of sinusoidal electric fields would encompass any continuous waveform of the sort:

$$f\left[\left(\frac{2\pi}{\lambda}\right)x \pm (2\pi f)t\right].$$

One of ordinary skill in the art would know that a traveling electric field can be created using two or more phases and one or more different waveforms. Furthermore, the method to impart an electrostatic charge to the particles 145, 245 can include filtering with respect to charge concurrently with the charging of the particles 145, 245 because the condition for particle 145, 245 travel is a function of the charge of the particle 145, 245, so the particle 145, 245 move out of the electrode area and onto the surface when the particle 145, 245 reaches an optimum charge and become charged particle 146, 246 as determined by the frequency and magnitude of the traveling electric field. Furthermore, the frequency and/or magnitude of the traveling electric field can be controlled to produce an optimum charge level of the particles 146, 246.

Figure 3:
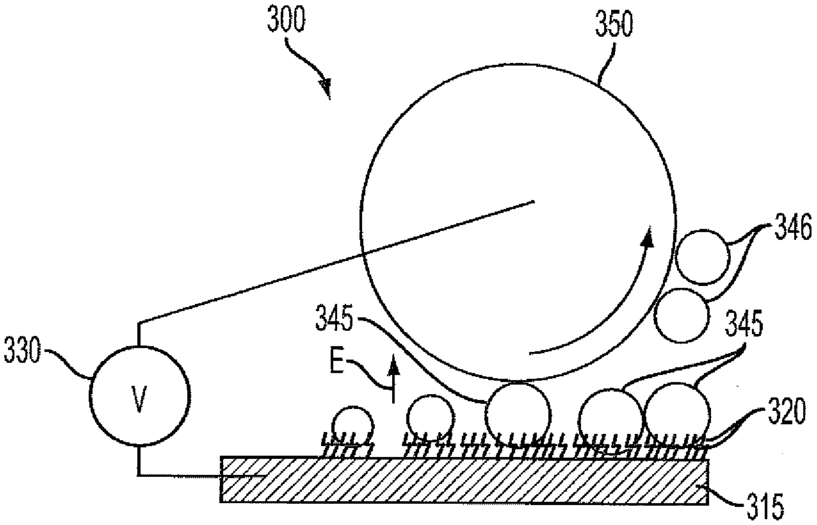
FIG. 3 illustrates yet another exemplary system to impart an electrostatic charge to particles, according to various embodiments of the present teachings.
Figure 4:
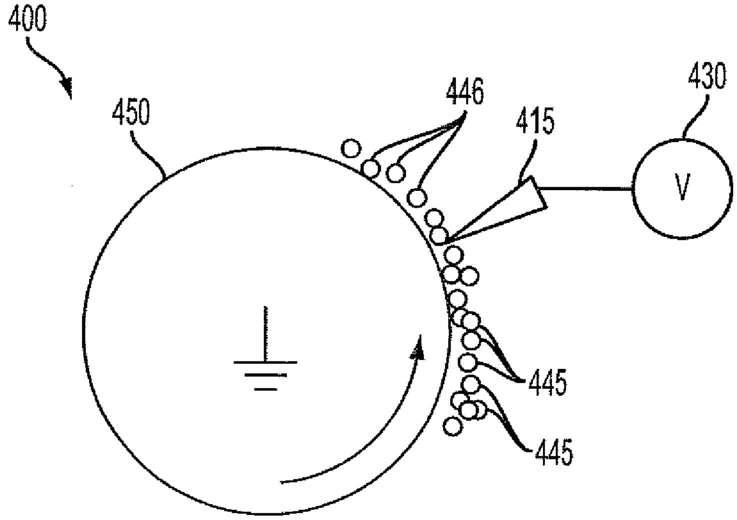
FIG. 4 illustrates another exemplary system to impart an electrostatic charge to particles, in accordance with the present teachings.
Figure 4A:
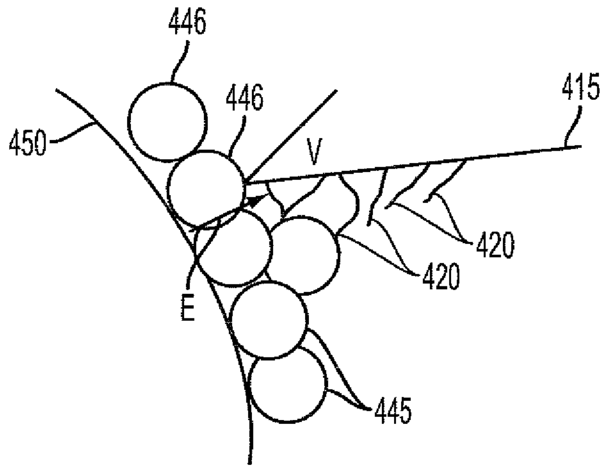
FIG. 4A illustrates a blown up view of the exemplary system to impart an electrostatic charge to particles shown in FIG. 4, according to various embodiments of the present teachings.

According to various embodiments, there are other exemplary systems 300, 400 to impart an electrostatic charge to particles 345, 445, as shown in FIGS. 3 and 4. The systems 300, 400 can include a plurality of particles 345, 445 to be charged and a plurality of nanostructures 320, 420 disposed over a first electrode 315, 415, wherein the first electrode 315, 415 can be disposed in close proximity to a rotating surface 350, 450. The systems 300, 400 can also include a power source 330, 430 to supply a voltage to create an electric field between the first electrode 315, 415 and the rotating surface 350, 450, wherein the electric field can cause an electron emission from the plurality of nanostructures 320, 420 and form a plurality of charged particles 346, 446. In some embodiments, the plurality of particles 345 to be charged can be disposed over the plurality of nanostructures 320, as shown in FIG. 3. In other embodiments, the plurality of particles 445 to be charged can be disposed over the rotating surface 450, as shown in FIGS. 4 and 4A. In certain embodiments, the first electrode 415 can have a blade shape, as shown in FIGS. 4 and 4A. In certain embodiments, the rotating surface 350, 450 can include at least one of a donor roll, a belt, a receptor, and a semi-conductive substrate.

According to various embodiments, there is a method to impart an electrostatic charge to particles 345, 445. The method can include providing a plurality of particles 345, 445 to be charged and providing a plurality of nanostructures 320, 420 disposed over a first electrode 315, 415, wherein the first electrode 315, 415 can be disposed in close proximity to a rotating surface 350, 450, as shown in FIGS. 3, 4, and 4A. In some embodiments, the step of providing a plurality of particles 345, 445 to be charged can include providing a plurality of particles 345 to be charged disposed over the plurality of nanostructures 320, as shown in FIG. 3. In other embodiments, the step of providing a plurality of particles 345, 445 to be charged can include providing a plurality of particles 445 to be charged disposed over the rotating surface 450, as shown in FIGS. 4 and 4A. In various embodiments, the step of providing a plurality of nanostructures 420 disposed over a first electrode 415 can include providing a first electrode 415 having a blade shape, as shown in FIGS. 4 and 4A. The method can also include applying an electric field between the first electrode 315, 415 and the rotating surface 350, 450, thereby causing electron emission from the plurality of nanostructures 320, 420 and forming a plurality of charged particles 346, 446. One of ordinary skill in the art would know that application of the electric field between the first electrode 315, 415 and the rotating surface 350, 450 can induce charge flow or corona generation at tips of the nanostructures 320, 420 to charge particles 345, 445 and the charging level of the particles 346, 446 can be controlled by the bias level.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to impart an electrostatic charge to particles comprising:

providing a plurality of particles to be charged;

providing a first electrode array comprising a plurality of three or more electrodes spaced apart, the first electrode array having a first end and a second end, the second end being closer to a receiving surface than the first end, and each electrode comprising a major surface, wherein the major surfaces of the plurality of electrodes are generally coplanar with each other;

providing a plurality of nanostructures disposed over the first electrode array;

providing a multi-phase voltage source operatively coupled to the first electrode array;

applying a multi-phase voltage to the first electrode array to create a traveling electric field between each electrode of the first electrode array, thereby causing electron emission from the plurality of nanostructures and forming a plurality of charged particles;

controlling an amount of electrostatic charge imparted to the plurality of particles by adjusting a frequency and/or a magnitude of the traveling electric field between each electrode of the first electrode array; and transporting the plurality of charged particles from the first end to the second end using the traveling electric field onto the receiving surface, wherein the traveling electric field imparts a force on the plurality of charged particles in at least one direction from the first end to the second end.

2. The method of claim 1, wherein the receiving surface comprises at least one of a donor roll, a belt, a receptor, and a semi-conductive substrate.

3. The method of claim 1, wherein the receiving surface comprises a rotating substrate.

4. The method of claim 1, wherein the multi-phase voltage source is operatively coupled to the first electrode array and the receiving surface.

5. The method of claim 1, wherein the step of providing a plurality of nanostructures disposed over a first electrode array comprises providing a plurality of nanostructures disposed over a first substrate, the substrate including a first electrode array.

6. The method of claim 1 further comprising providing a second plurality of nanostructures disposed over a second electrode array, the second electrode array including a plurality of electrodes spaced apart, each electrode in the second electrode array comprising a major surface, wherein the major surface of each of the plurality of electrodes in the second electrode array are generally coplanar with each other, wherein the second electrode array is disposed substantially parallel to and opposite to the first electrode array.

7. The method of claim 6, wherein the step of applying a multi-phase voltage to the first electrode array to create a traveling electric field between each electrode of the first electrode array comprises applying multi-phase voltages to the first electrode array and applying multi-phase voltages to the second electrode array to create a first traveling electric field between each electrode of the first electrode array and a second traveling electric field between each electrode of the second electrode array.

8. The method of claim 1, wherein the traveling electric field is at least one of a square-wave alternating electric field, a sinusoidal alternating electric field, and sum of sinusoidal electric fields.

9. A system to impart n electrostatic charge to particles comprising:

a plurality of nanostructures disposed over a first electrode array, wherein the first electrode array comprises a plurality of three or more electrodes spaced apart, the first electrode array having a first end and a second end, the second end being closer to a receiving surface than the first end, and each electrode comprising a major surface, wherein the major surfaces of the plurality of electrodes are generally coplanar with each other;

a power source operatively coupled to the first electrode array to supply a multi-phase voltage to the first electrode array and adapted to create a traveling electric field between each electrode of the first electrode array, wherein the traveling electric field is adapted to cause electron emission from the plurality of nanostructures and is further adapted to form a plurality of charged particles;

a controller configured to control an amount of electrostatic charge imparted to the plurality of particles by adjusting a frequency and/or a magnitude of the traveling electric field between each electrode of the first electrode array; and a receiving surface in close proximity to the plurality of nanostructures at the second end of the first electrode array, wherein the system is adapted to transport the plurality of charged particles onto the receiving surface from the first end to the second end using the traveling electric field, wherein the traveling electric field imparts a force on the plurality of charged particles in at least one direction from the first end to the second end.

10. The system of claim 9, wherein the receiving surface comprises at least one of a donor roll, a belt, a receptor, and a semi-conductive substrate.

11. The system of claim 9, wherein the power source is operatively coupled to the first electrode array and the receiving surface.

12. The system of claim 9, wherein the plurality of nanostructures are disposed over a first substrate including an embedded first electrode array.

13. The system of claim 9 further comprising a second plurality of nanostructures disposed over a second electrode array, the second electrode array comprising a plurality of electrodes spaced apart, each electrode in the second electrode array comprising a major surface, wherein the major surfaces of each of the plurality of electrodes in the second electrode array are generally coplanar with each other, wherein the second electrode array is disposed substantially parallel to and opposite to the first electrode array.

14. The system of claim 13, wherein the power source is operatively coupled to the first electrode array and the second electrode array to apply multi-phase voltages to the first electrode array and to apply the multi-phase voltages the second electrode array to create a first traveling electric field between each electrode of the first electrode array and a second traveling electric field between each electrode of the second electrode array.

* * * * *